US012746460B2

(12) United States Patent
Cerrato et al.

(10) Patent No.: US 12,746,460 B2
(45) Date of Patent: Sep. 29, 2026

(54) ENTERTAINMENT SYSTEM, A METHOD AND A COMPUTER PROGRAM

(71) Applicant: Sony Interactive Entertainment Inc., Tokyo (JP)

(72) Inventors: Maurizio Cerrato, London (GB); Daniele Bernabei, London (GB); Mark Friend, London (GB); Hogarth Andall, London (GB); Richard Downey, London (GB); Danjeli Schembri, London (GB); Daniel Israel Pereira Jimenez, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 426 days.

(21) Appl. No.: 18/354,152

(22) Filed: Jul. 18, 2023

(65) Prior Publication Data

US 2024/0024762 A1 Jan. 25, 2024

(30) Foreign Application Priority Data

Jul. 22, 2022 (GB) ...................................... 2210745

(51) Int. Cl.

*A63F 13/22* (2014.01)
*A63F 13/211* (2014.01)
*A63F 13/533* (2014.01)

(52) U.S. Cl.

CPC ............ *A63F 13/22* (2014.09); *A63F 13/211* (2014.09); *A63F 13/533* (2014.09); *A63F 2300/1018* (2013.01)

(58) Field of Classification Search

CPC ...... A63F 13/22; A63F 13/211; A63F 13/533; A63F 2300/1018
USPC ............................................................ 463/37
See application file for complete search history.

(56) References Cited

U.S. PATENT DOCUMENTS 9,804,864 B1 * 10/2017 Sharma .................. G06F 9/445
10,751,611 B2 * 8/2020 Monastyrskyy .......... G06F 3/02
11,103,774 B2 * 8/2021 Black ...................... A63F 13/98
2001/0045938 A1 11/2001 Willner et al.
(Continued)

OTHER PUBLICATIONS

GB2210745.2 , “Examination Report”, Dec. 27, 2024, 4 pages.
(Continued)

*Primary Examiner* — Allen Chan
(74) *Attorney, Agent, or Firm* — Fish & Richardson P.C.

(57) ABSTRACT

An entertainment system includes circuitry configured to receive input signals from at least a first input device and a second input device, where each input signal corresponds to a control in one of the input devices, determine whether each input signal is included in a respective control subset allocated to the input device from which the input signal was received, determine if each input signal is an input signal to be utilised based on whether it is included in the respective control subset, treat input signals to be utilised from any of the input devices as input signals from the same single input device, and determine, according to a predetermined control scheme, a process to be executed based on the input signals to be utilised, and where the respective control subsets each comprise at least one control not found in the other control subsets, and the respective control subsets together comprise a full complement of controls for an input device.

20 Claims, 7 Drawing Sheets

(56) References Cited

U.S. PATENT DOCUMENTS

| | | | | |
|---|---|---|---|---|
| 2004/0178576 | A1 | 9/2004 | Hillis | |
| 2006/0250351 | A1 | 11/2006 | Fu | |
| 2014/0342830 | A1 | 11/2014 | Musick, Jr. | |
| 2015/0084900 | A1 | 3/2015 | Hodges et al. | |
| 2016/0184712 | A1* | 6/2016 | Colenbrander | A63F 13/49<br>463/29 |
| 2016/0375363 | A1 | 12/2016 | Connor | |
| 2019/0217193 | A1 | 7/2019 | Wells | |
| 2019/0294260 | A1 | 9/2019 | Banks | |
| 2019/0354759 | A1* | 11/2019 | Somers | A63F 13/67 |
| 2019/0366210 | A1 | 12/2019 | Beltran et al. | |
| 2019/0391719 | A1 | 12/2019 | Agrawal et al. | |
| 2021/0117081 | A1 | 4/2021 | Coman et al. | |
| 2022/0134220 | A1* | 5/2022 | Dang | A63F 13/22<br>463/37 |

OTHER PUBLICATIONS

Combined Search and Examination Report for corresponding GB Application No. 2210745.2, 7 pages, dated Jan. 23, 2023.

Extended European Search Report for corresponding EP Application No. 23185415.9, 9 pages, dated Nov. 30, 2023.

* cited by examiner

ENTERTAINMENT SYSTEM, A METHOD AND A COMPUTER PROGRAM

BACKGROUND OF THE INVENTION

Field of Invention

The present invention relates to an entertainment system, a method and a computer program.

Background

In the field of electronic games, it is desirable to improve accessibility among users for whom typical gameplay is more difficult. For example, some users may have difficulty assimilating on-screen information and reacting appropriately with their inputs on a controller if they have some form of sensory processing issue, cognitive processing issue, motor control issue or the like. Those with cognitive issues may find it particularly difficult to play a video game unassisted due to the number of user inputs (and combinations thereof) that they are required to learn in order to control an in-game character.

The present invention seeks to alleviate or mitigate this issue.

SUMMARY OF THE INVENTION

In a first aspect, an entertainment system is provided in claim 1.

In another aspect, a method of utilising input signals from two or more input devices is provided in claim 14.

Further respective aspects and features of the invention are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

An entertainment system, a method and a computer program are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Figure 1:
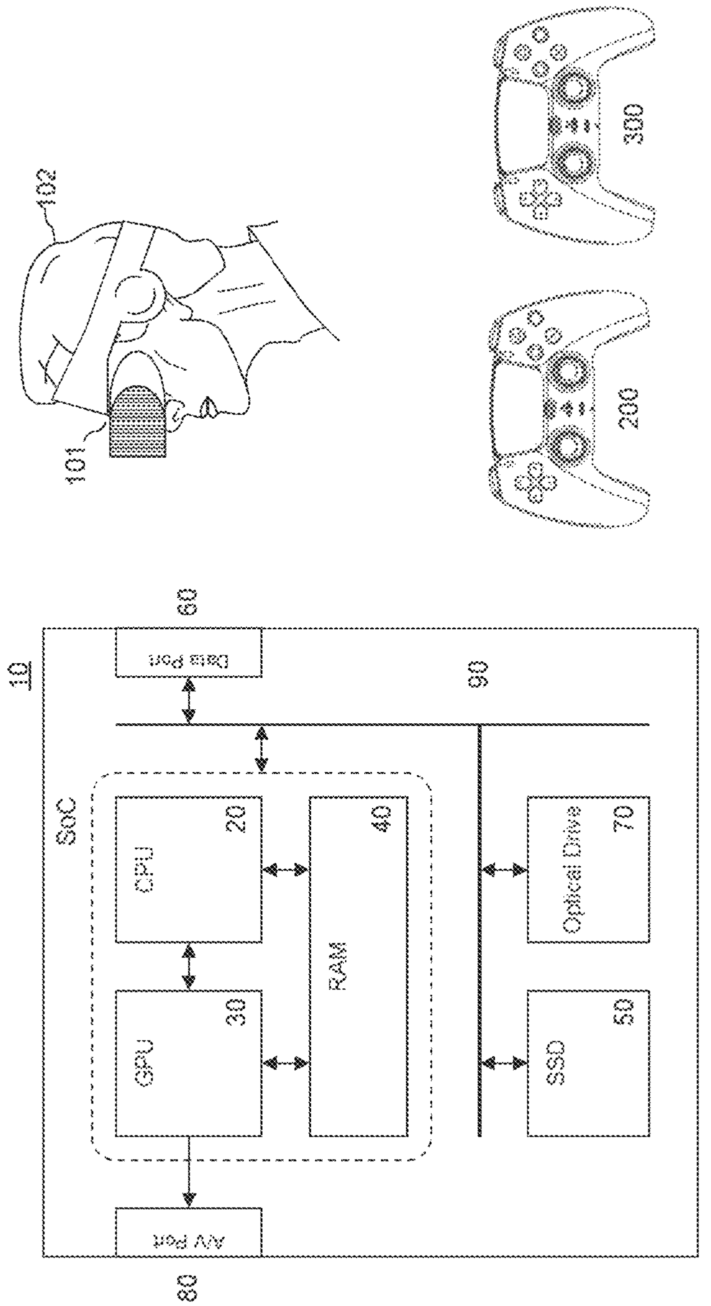
FIG. 1 depicts an entertainment system 10.

Referring now to the drawings, wherein like reference numerals designate identical or corresponding parts throughout the several views, in FIG. 1, an entertainment system 10 is depicted. An example of the entertainment system 10 is a computer or console such as the Sony® PlayStation 5® (PS5). The entertainment system 10 comprises a central processor 20. This may be a single or multi core processor, for example comprising eight cores as in the PS5. The entertainment system 10 also comprises a graphical processing unit or GPU 30. The GPU can be physically separate to the CPU, or integrated with the CPU as a system on a chip (SoC) as in the PS5.

The entertainment system 10 also comprises RAM 40, and may either have separate RAM for each of the CPU and GPU, or shared RAM as in the PS5. Each RAM can be physically separate, or integrated as part of an SoC as in the PS5. Further storage is provided by a disk 50, either as an external or internal hard drive, or as an external solid state drive, or an internal solid state drive as in the PS5.

The entertainment system 10 may transmit or receive data via one or more data ports 60, such as a USB port, Ethernet® port, WiFi® port, Bluetooth® port or similar, as appropriate. It may also optionally receive data via an optical drive 70. Audio/visual outputs from the entertainment system 10 are typically provided through one or more A/V ports 80, or through one or more of the wired or wireless data ports 60. Where components are not integrated, they may be connected as appropriate either by a dedicated data link or via a bus 90. In embodiments, the entertainment system 10 is configured to output image data to a display. An example of a device for displaying images output by the entertainment system 10 is a head mounted display 'HMD' 101, worn by a user 102.

Interaction with the entertainment system 10 is provided via two or more input devices. Each input device is configured to produce input signals, for example in response to an interaction by a user (a user interaction), and transmit the input signals to the entertainment system 10. The entertainment system 10 comprises circuitry configured to receive the input signals and interpret them according to a predetermined control scheme to cause an interaction with either an operating system of the entertainment system 10 or an application running on it. This will be described in more detail below. When the entertainment system 10 is the PS5, one or more of the input devices may be a DualSense® controller, such as both device 200 and device 300 in FIG. 1. However, the present disclosure in not limited in this regard and each of the input devices may be any suitable type of input device in embodiments. For example, in some embodiments one or more of the input devices may be a mobile phone, a tablet device, a computer, a handheld controller other than a DualSense® controller, or the like. In further embodiments, one or more of the input devices may be a virtual controller that provides input signals to the entertainment system 10 according to a processing result rather than in response to a user interaction. This is described in more detail later.

Figure 2:
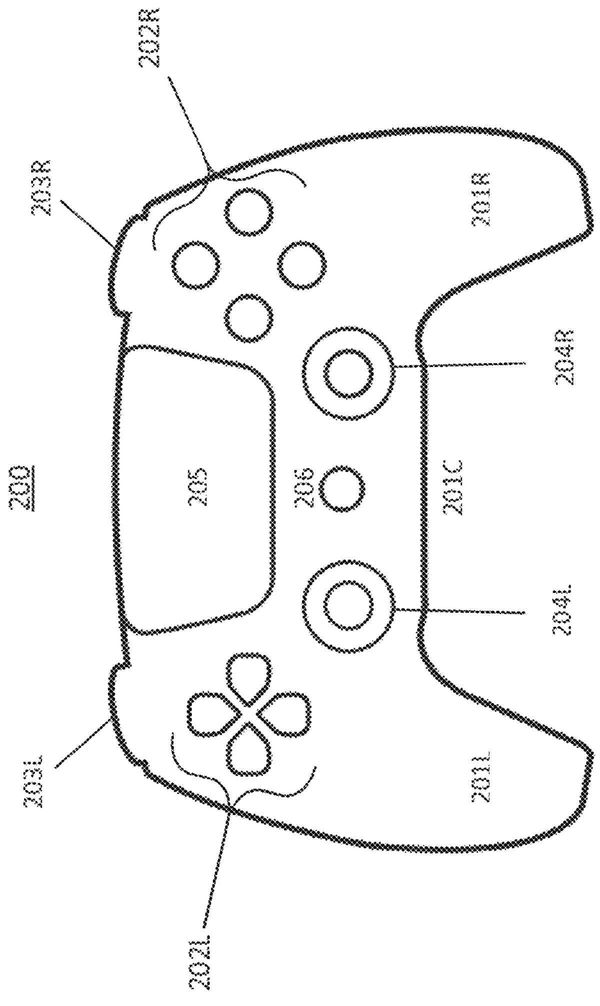
FIG. 2 schematically illustrates a controller 200.

In FIG. 2, the device 200 is schematically illustrated. Handheld controllers such as device 200 typically have two handle sections such as 201L,R and a central body such as 201C. Various controls are distributed over such a controller, typically in local groups. Examples include a left button group, which may comprise directional controls, and similarly a right button group, which comprise function controls. Device 200 comprises the left button group 202L and the right button group 202R. A handheld controller may additionally include one or more shoulder buttons (such as

203L,R) and also left and/or right joysticks (such as 204L,R) which may optionally also be operable as buttons by pressing down on them.

The device 200 further comprises the system button 206. A handheld controller may comprise one or more system buttons such as 206, typically in the central portion of the device, which cause interaction with an operating system of the entertainment system 10 rather than with a game or other application currently running on it. Such buttons may summon a system menu, allow for recording or sharing of displayed content, or the like. Furthermore, a handheld controller may comprise one or more other elements such as the touchpad 205 seen in FIG. 2, a light for optical tracking (not shown), a screen (not shown), haptic feedback elements (not shown), and the like.

In embodiments, an input device such as device 200 further comprises circuitry that is configured to produce one or more input signals when a user interacts with one of the controls, and then transmit the input signals to the entertainment system 10 via a wired or wireless connection. The properties of a particular input signal indicate the control that the user interacted with to produce that input signal. That is, the properties of each input signal will indicate a particular control to which the input signal corresponds. For example, if a user presses the left shoulder button 203L of device 200, the input signal produced as a result will correspond to the left shoulder button 203L. In embodiments, an input signal further indicates one or more characteristics of the user interaction with the corresponding control. The input signal will therefore correspond to a particular user interaction in addition to a particular control. For example, an input signal produced by a user interacting with the left joystick 204L may indicate that the user interaction comprised pulling the left joystick 204L in a certain direction with a certain force. The disclosure is not limited in this regard however, and in further embodiments any suitable characteristics of a user interaction that are measureable by the input device may be indicated by the input signal.

The entertainment system 10 comprises circuitry configured to receive such input signals from each of the two or more input devices and interpret the signals to cause an interaction with an operating system of the system 10, or with an application running on the system 10 such as a video game. The system 10 interprets the received input signals by determining a process to be executed based on the properties of the input signals according to a predetermined control scheme. The predetermined control scheme may be received by the system 10 from internal storage, a remote server or any other suitable source, or may be provided by an application running on the system 10. For example, a video game running on the system 10 may provide a control scheme that associates different controls (and/or different user interactions with each control) to actions performed within the video game (in-game actions) by a virtual character. When an input signal that corresponds to a particular user interaction is received, processing is executed such that the virtual character performs the associated in-game action.

Video game control schemes often associate a combination of user interactions with a single in-game action, such that the in-game action is only performed when all the user interactions in the combination occur substantially simultaneously. For example, the game character may be made to perform a unique in-game action when an input signal corresponding to the left shoulder button 203L being pressed and an input signal corresponding to the right shoulder button 203R being pressed are received within a predetermined time of each other.

In existing entertainment systems, when input signals are received from more than one input device, input signals received from a first device are interpreted separately from input signals received from a second device. When a video game is run in a 'multiplayer mode', for example, the input signals from a first controller are interpreted to control the in-game actions of a first character according to the control scheme of the game, whilst input signals from a second controller are interpreted to control the in-game actions of a second character according to the same control scheme.

In the present invention, however, input signals that are received from two or more input devices are interpreted by the entertainment system 10 as if they were received from the same input device. Specifically, certain input signals from each device are determined to be input signals to be utilised and treated as if they were received from the same input device when being interpreted according to a predetermined control scheme. In some embodiments the remaining input signals from each device are interpreted separately, whilst in other embodiments they are ignored.

The determination of whether an input signal from an input device is to be utilised is based on whether the input signal is included in a control subset allocated to that input device. Here, a control subset is a subset of one or more controls, and an input signal is included in a certain control subset if it corresponds to a control that falls within that subset (that is, if the signal was produced as a result of a user interaction with that control). The controls within a particular control subset are determined by a sharing scheme, which is discussed in more detail later. In the present disclosure, the two or more input devices transmitting input signals to the entertainment system 10 are each allocated at least one respective control subset by the system 10.

Figure 3:
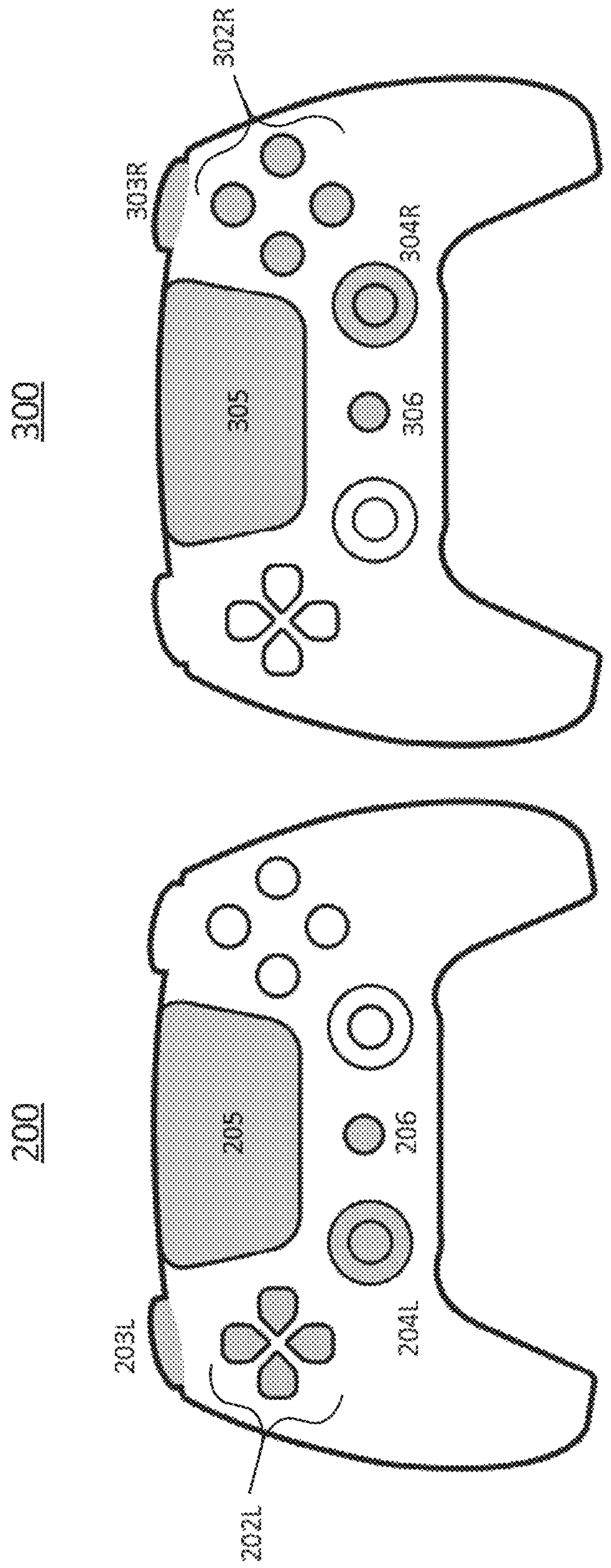
FIG. 3 schematically illustrates two input devices, device 200 and device 300.

FIG. 3 illustrates two input devices in embodiments, device 200 and device 300. In these embodiments, each device is allocated a single control subset, subsets 2A and 3A respectively. The controls of a device that fall within the respective control subset allocated to that device are shaded. It is therefore apparent that controls 202L, 203L, 204L, 205 and 206 are within subset 2A allocated to device 200, whilst controls 302R, 303R, 304R, 305 and 306 are within the subset 3A allocated to device 300.

A control subset allocated to a particular input device comprises one or more controls of the allocated input device, and in embodiments comprises at least one control not found in any other control subset. In FIG. 3 for example, the subset 2A allocated to device 200 comprises controls 203L, 202L and 204L that are not within subset 3A allocated to device 300. In some embodiments, an overlap exists where corresponding controls in different devices are each included in a control subset allocated to their respective device. This can be seen in FIG. 3, where the touchpad 205 in device 200 is included in subset 2A and the corresponding touchpad 305 in device 300 is included in subset 3A.

When the entertainment system 10 receives an input signal from one of the two or more input devices, it is determined whether the input signal is included in a control subset allocated to that input device. Based on this determination, it is then determined whether the input signal is an input signal to be utilised. In some embodiments, it is determined that the input signal is an input signal to be utilised if the input signal is included in the respective control subset. For example, in embodiments depicted in FIG. 3, all input signals from device 200 that are included in subset 2A and all input signals from device 300 that are included in subset 3A are input signals to be utilised. However, the disclosure is not limited in this regard and in other embodiments an input signal to be utilised may be defined as an input signal that is not included in a respective control subset.

The entertainment system 10 then treats all input signals to be utilised as if they were received from the same input device, and interprets them all according to a predetermined control scheme regardless of the input device from which they were received.

Notably therefore a game or other application running on the system operates transparently, receiving as if from one controller inputs aggregated from the utilised subsets of inputs from the multiple controllers. This allows multiple controllers to be used cooperatively to potentially control any game or application that can normally take input from one conventional controller.

This is to be distinguished from games that deliberately use inputs from multiple users to cooperatively control a game; hence for example single player mode in the game 'Octodad' allows a user to use different inputs on a single controller to control each limb on the main character, whilst multiplayer mode allows multiple users to use inputs on respective controllers each to control a respective subset of the character's limbs. By contrast the present techniques cause complementary inputs from multiple users' controllers to be combined to act as a inputs from a single controller, and so would be used here in single player mode.

In some embodiments, input signals to be utilised are interpreted according to more than one predetermined control scheme. For example, in FIG. 3 it can be seen that subsets 2A and 3A include system controls 206 and 306 respectively. Input signals corresponding to these controls are interpreted according to a predetermined control scheme for interaction with the operating system of the entertainment system 10, rather than a predetermined control scheme of a video game. In other embodiments however, each input device may be allocated an additional control subset for system controls. For example, device 200 may be allocated an additional control subset comprising control 206 only, whilst device 300 is allocated an additional control subset comprising control 306 only. In this example, each additional control subset for system controls overlaps completely with the other additional control subsets.

Treating all input signals to be utilised as if they were received from the same input device allows multiple users with their own separate controllers to cause the same video game character to perform in-game actions. In embodiments depicted in FIG. 3 for example, a first person using device 200 can interact with controls in subset 2A to cause a game character to perform the in-game actions associated with those controls, and a second person using device 300 can interact with controls in subset 3A to cause the same game character to perform the in-game actions associated with those controls. If the first person interacts with a control that is not in subset 2A or the second person interacts with a control that is not in subset 3A, the input will not be interpreted and the game character will not perform the associated in-game action. In addition, in this example both users can still interact with their respective system buttons to access functions such as pausing the game, bringing up a menu or the like.

When two or more people share control (for example of a single character) in this way, each person only needs to interact with a limited number of controls, and does not have to remember or pay attention to in-game actions associated with other controls. Each person therefore has less information to consider and remember individually, which makes gameplay easier for those with cognitive issues or the like. In-game actions that require multiple simultaneous user interactions (e.g. two buttons to be pressed at once) are also easier to achieve if each person only needs to interact with one control, as long as each person's interaction occurs within a predetermined time of each other. Similarly, if an overlap exists between respective control subsets two people can press corresponding controls at approximately the same time in order to simulate a single person pressing the same button twice very quickly. The shared control therefore makes gameplay more accessible for people who have difficulty pressing the same button twice very quickly.

Video games often support different types of controllers. For example, a control scheme of a video game may associate both controls on a handheld controller and controls on a mobile phone with a particular set of in-game actions, such that a user may play with either a handheld controller or a mobile phone at a given time. In order to treat input signals from multiple input devices as input signals from the same device, the respective control subsets must together comprise a full complement of controls for a single input device (a full complement being either the full set of controls available on one controller, or the full set of controls expected by a target application, which may be a subset of all the controls available on one controller). This is not limited to controls from a single type of input device, however. A full complement of controls must merely comprise at least one control associated with each type of interaction with the operating system or application running on the system 10 as determined by the one or more predetermined control schemes being used. For example, a full complement of controls may be configured such that every possible in-game action defined in a video game control scheme is associated with at least one control, but wherein some of the controls are controls on a handheld controller and some are controls on a mobile phone. Similarly, when an overlap exists between control subsets, 'corresponding' controls in different input devices may be controls that are allocated to the same in-game action but are different types of controls in different types of input devices.

This allows users to use to share control over the same character even if they each wish to use a different type of device. Accessibility is therefore further improved for users who each find a different type of device easier to use.

The controls within a particular control subset are determined by a particular sharing scheme. Returning to FIG. 3, the sharing scheme used in the embodiments depicted dictates that subset 2A comprises controls located on the left side and centre of device 200, whilst subset 3A comprises controls located on the right side and centre of device 300. This sharing scheme is intuitive and easy to remember for two people sharing control over the same video game character, particularly in situations where the two people are physically located side-by-side (i.e. when the person using device 200 is situated to the left of the person using device 300). This sharing scheme is also particularly useful when one or more of the users has mobility issues with one hand, since all the useable controls for each device are reachable with one hand.

Figure 4:
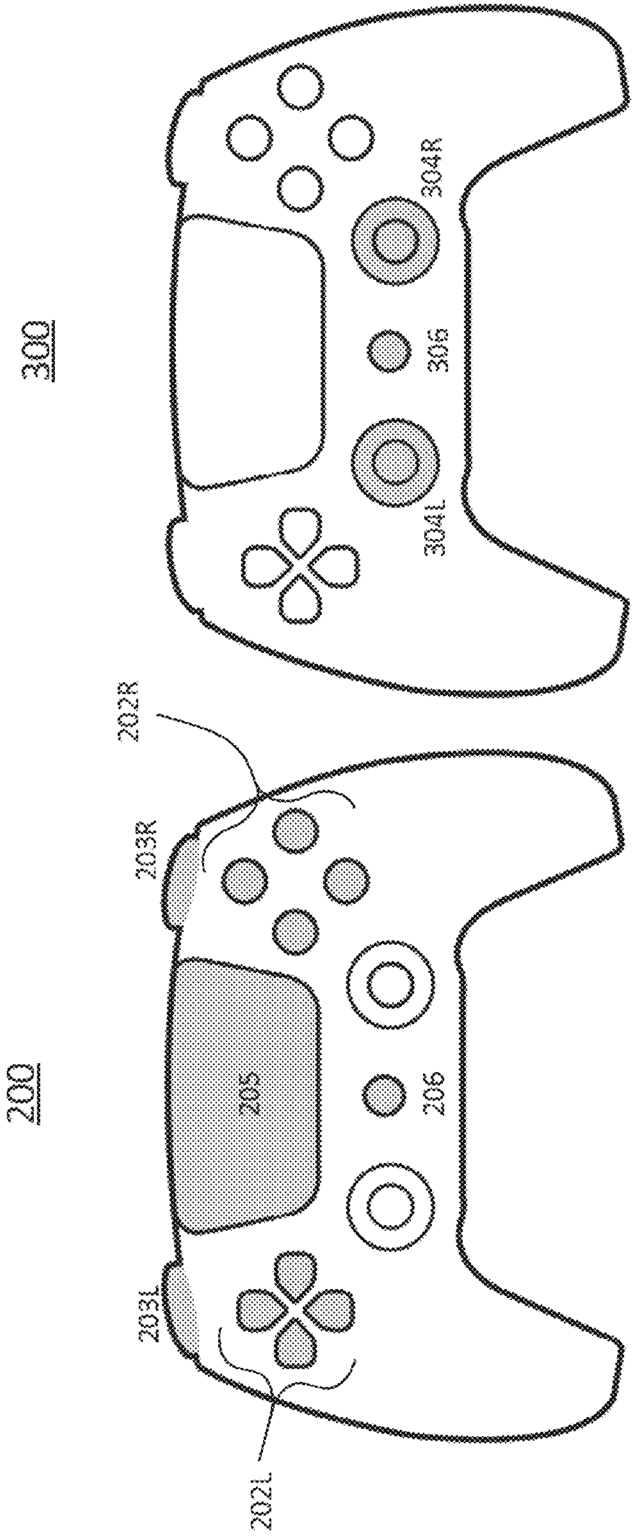
FIG. 4 schematically illustrates device 200 and device 300 in further embodiments.

The disclosure is not limited in this regard, however, and other sharing schemes may be used in further embodiments. FIG. 4 illustrates another sharing scheme in embodiments, in which the control subset 2B allocated to device 200 comprises controls 202L, 202R, 203L, 203R, 205 and 206 whilst control subset 3B allocated to device 300 comprises controls 304L, 304R and 306. As with subsets 2A and 3A in the sharing scheme of FIG. 3, subsets 2B and 3B overlap such that the system buttons 206 and 306 are useable for each device. Aside from the system buttons, the control subset of device 300 comprises only joysticks whilst the control subset of device 200 comprises only buttons.

Sharing schemes in which each device is allocated a subset comprising controls of a different type are also intuitive and easy to remember for the users. Such sharing schemes are also particularly advantageous when one or more of the users finds it harder to use a certain type of control and thus prefers to avoid using controls of that type. For example, if a person finds remembering button combinations particularly difficult they can use a device with a control subset such as 3B that does not comprise buttons (excluding 306). Similarly if a user has difficulty reaching particular controls like the shoulder buttons 203L,R (for example due to arthritis) then they can use a device with a control subset such as 3B that again does not comprise the shoulder buttons. In some sharing schemes, certain subsets may non-exclusively comprise controls of a particular type that is not present in other subsets. For example, one device may be allocated a control subset comprising only buttons, whereas another device is allocated a subset comprising both buttons and joysticks. In further embodiments (not shown) a control subset allocated to a first input device comprises controls that are motion sensors whilst a subset allocated to a second input device does not comprise controls that are motion sensors. This is particularly advantageous if a person using the first input device finds it harder to use motion controls.

In embodiments, the sharing scheme used is a predetermined sharing scheme that is selected by the entertainment system 10 from one or more predetermined sharing schemes. The one or more predetermined sharing schemes may be retrieved by the entertainment system 10 via any suitable means from internal or external storage, an external device, a network or the like.

In some embodiments, the entertainment system 10 is configured to select a predetermined sharing scheme based on an application running on the system. For example, a sharing scheme may be associated with a particular video game. Certain in-game actions may be easier to split up between multiple people: for example, gameplay may be more intuitive when one person causes a character to move whilst another causes the character to fight. A sharing scheme associated with a particular video game may therefore be a scheme in which the respective control subsets divide the controls, and therefore the allocated in-game actions, in a way that makes sharing control of a game character easier for the users in that particular game.

The disclosure is not limited in this regard however, and in other embodiments the entertainment system 10 selects the predetermined sharing scheme according to any other suitable method. For example, the system 10 may select a sharing scheme that has been used the most recently, or a sharing scheme that has been used the most frequently in the past.

In further embodiments, the entertainment system 10 is configured to present a selection of predetermined sharing schemes to a user via a user interface, for example by causing such a user interface to be displayed on a device for displaying images (such as the HMD 101 in FIG. 1). The user may then interact with the user interface to choose a sharing scheme to be used from the selection presented to them.

Figure 5:
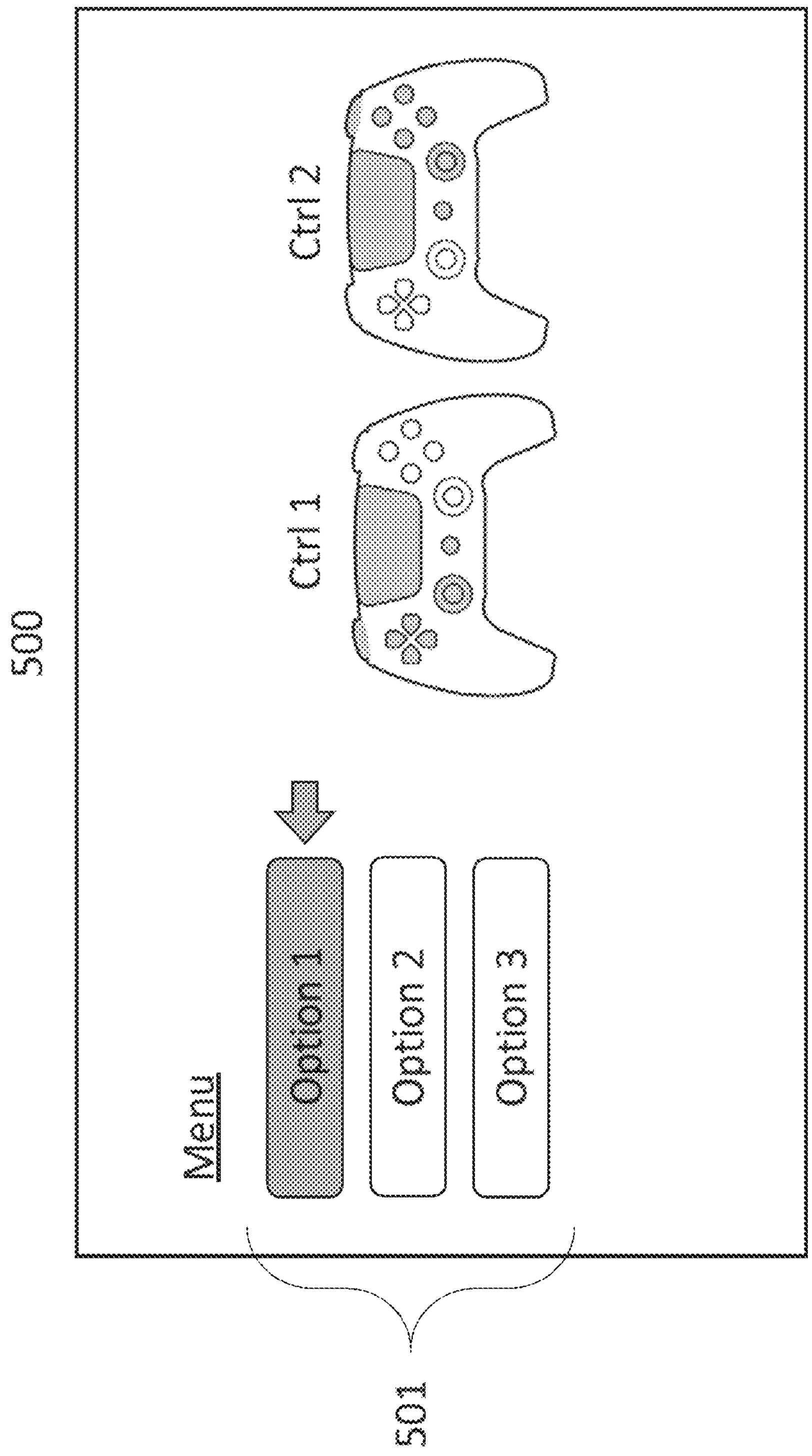
FIG. 5 depicts a user interface 500 that is presented to a user.

FIG. 5 depicts a user interface 500 that is presented to a user in embodiments. Here, the user is presented with a selection of three predetermined sharing schemes 501, labelled 'Option 1', 'Option 2' and 'Option 3' respectively. Option 1 is coloured differently to the other options and is indicated by an arrow, showing that this sharing scheme is currently selected. The user interface 500 also includes a visual representation of the currently-selected predetermined sharing scheme: a depiction of each input device, wherein for each input device the controls that are in the allocated respective control subset are shaded. This allows the user to better understand the configuration of each sharing scheme and choose a particular scheme as appropriate. However, the disclosure is not limited in this regard and in other embodiments the user interface may present the selection of predetermined sharing schemes to the user in any suitable manner. For example, the user interface may present the user with any number of predetermined sharing schemes to be selected from, and in some embodiments the user interface may not include a visual representation of the controls. By allowing a user to choose a sharing scheme from a selection, it is ensured that a sharing scheme is used that is desirable to the user.

Figure 6:
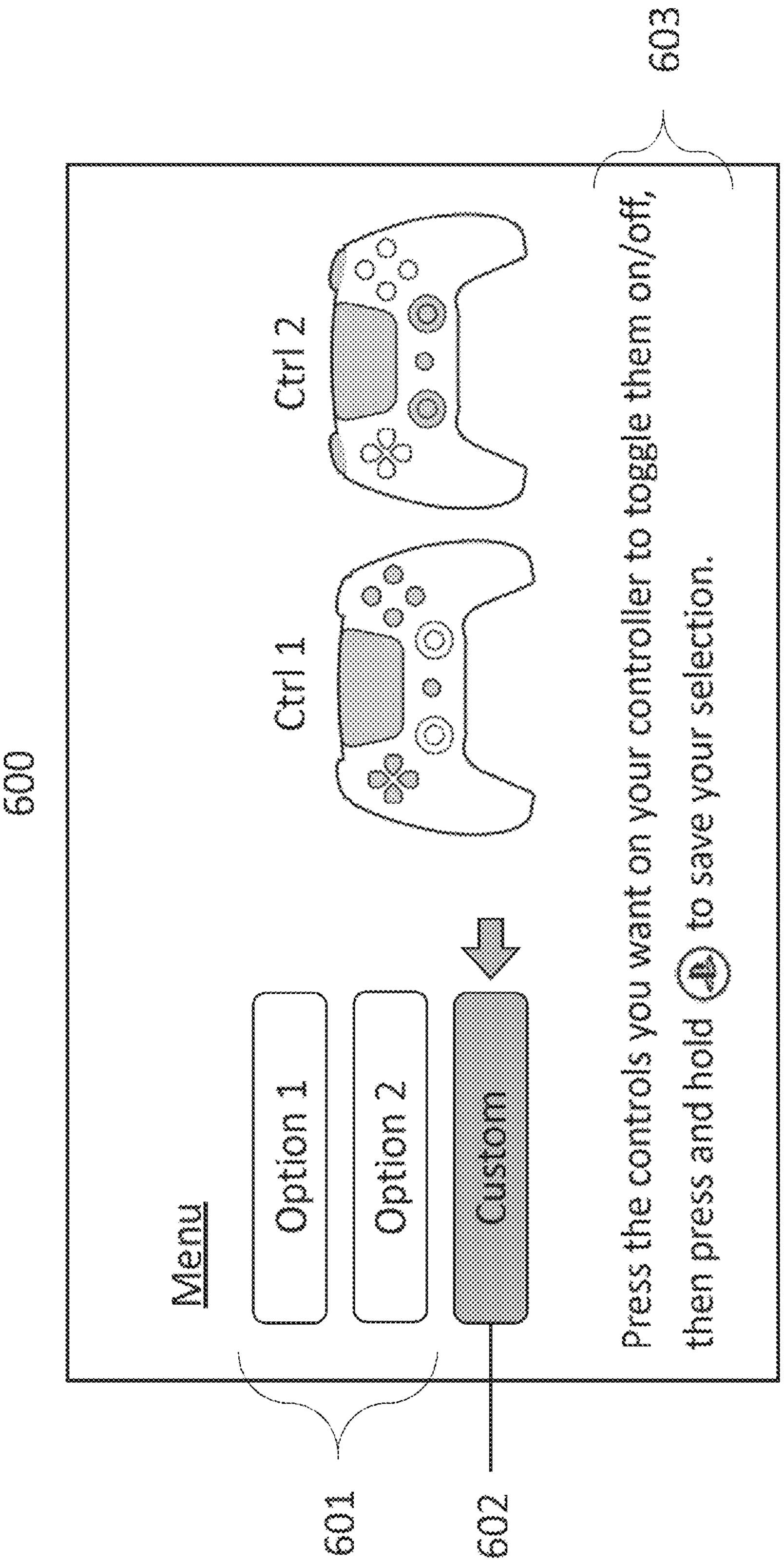
FIG. 6 depicts a user interface 600 that is provided to a user.

In further embodiments, the entertainment system 10 is configured to present a user with a user interface that allows them to customize a sharing scheme by choosing the content of different control subsets. FIG. 6 depicts such a user interface. Here, the user interface 600 presents a selection of two predetermined sharing schemes 601, labelled 'Option 1' and 'Option 2' respectively, and a third 'Custom' option 602. The user interface 600 also includes a visual representation of the 'Custom' sharing scheme, depicting each input device and indicating which (shaded) controls are in the allocated respective control subsets. When the third option 602 is selected, instructions 603 are displayed that instruct each user to select the controls to be included in the respective control subset allocated to their controller. In these embodiments, instructions 603 direct the users to press a control in their respective controllers to indicate that the control should be included in the allocated control subset (that is, the control should be useable by the person with that controller) and press it again to indicate that it should not be included. However, the disclosure is not limited in this regard and in various embodiments the user interface may present the option to customize a sharing scheme in any suitable manner. For example, in some embodiments only one user is able to select which controls are included in each control subset. In some embodiments, after a user has customized a control subsets for an input device the entertainment system 10 is configured to automatically customize a control subset allocated to another input device such that all the respective control subsets together comprise a full complement of controls. By allowing one or more users to customize their own sharing scheme, it is further ensured that a sharing scheme is used that is desirable to the user.

In some embodiments, a user interface such as those described above can be accessed by a user by navigating to a particular menu provided by the entertainment system 10. This may be accessible while an application is being run on the entertainment system 10, or may only be accessible whilst the application is not being run. In some embodiments the entertainment system uses a predetermined control system that allocates a particular control to present the user interface. The user interface is therefore presented to a user in response to the user interacting with the control, even while an application is being run. This may be achieved by pausing the video game being played and displaying the user interface overlaid on the screen, for example. Allowing a user to access the user interface whilst a video game is being played enables the user to re-select a different sharing scheme at any time if they wish, for example if they are finding the currently-selected sharing scheme to be unintuitive.

In embodiments, the entertainment system 10 is configured to present a display to a user comprising a visual representation of the respective control subsets of one or more of the input devices according to the current sharing scheme. The visual representation may take any form suitable to indicate which controls are in a respective control subset. For example, the display may comprise a depiction of each input device, wherein for each input device the controls that are in the allocated respective control subset are shaded, such as the visual representations in FIG. 5 and FIG. 6. This display may be accessed by a user in any of the manners described above with regard to a user interface. For example, in some embodiments the display is presented to a user in response to the user interacting with a particular control, even while an application is being run.

In some embodiments, the particular respective control subset or subsets that are visually represented in the display is selected based on the particular input device that a user interacted with to access the display. For example, if a person using device 200 pressed the system button 206 to cause the entertainment system 10 to present the display, the display may be a visual representation of the respective control subset 2A allocated to device 200. This allows a user to remind themselves which controls are included in the respective control subset allocated to the device they are using, further improving ease of use.

In some embodiments, the entertainment system 10 presents a particular display on the basis of an application is being run on the entertainment system 10 at the time. For example, if a particular video game is being played, the system 10 may present a display that includes information relating to the predetermined control scheme of the game, such as labels showing the in-game actions associated with each of the controls within a respective control subset. In these embodiments, a user is therefore able to see which controls are useable in the input device they are using and also the associated in-game actions. This allows the user to see which controls are included in the respective control subset allocated to the device they are using in an even more intuitive manner that is relevant to the gameplay of the video game.

In further embodiments, the entertainment system 10 is configured to determine a number of input signals that are not input signals to be utilised that have been received from a certain input device within a predetermined time and provide the display to a user in the form of an alert when the determined number of input signals exceeds a predetermined threshold. This allows the system 10 to automatically present a user with a reminder of which controls are included in the respective control subset allocated to the device they are using in a situation where the user has been trying to use controls that are not being interpreted.

In some embodiments, at least one of the input devices is a virtual input device. A virtual input device may be any series of processing steps that produces input signals which can be interpreted by the entertainment system 10 in the same way as the input signals received from a physical (non-virtual) input device. A virtual input device will therefore produce input signals that each correspond to a particular control in a physical input device, as if they had been produced by a user interaction with that control. However, the timing at which the input signals are produced and the properties of each input signal are determined according to a processing result rather than according to a user interaction. In embodiments, a single virtual input device may only produce input signals that correspond to controls in a single type of physical input device.

The entertainment system 10 interprets input signals received from a virtual input device according to a predetermined control scheme as if the input signal was received from a physical input device. That is, the system 10 will allocate one or more control subsets to a virtual input device and determine whether each input signal received from the virtual input device is an input signal to be utilised based on whether the input signal corresponds to a control within the allocated control subset, and combine this with utilised inputs from a physical controller to present as a single overall controller, as described above.

In some embodiments, the series of processing steps that comprise the virtual input device are executed by an external source (such as a remote server) and the entertainment system 10 receives input signals from the external source via a wired or wireless connection. In further embodiments, the entertainment system 10 itself comprises circuitry configured to execute the series of processing steps and therefore produce the input signals associated with the virtual input device. The virtual input device may produce input signals in a predetermined manner, such that the timing and properties of each input signal are predetermined. However, the disclosure is not limited in this regard and in other embodiments the virtual input device may produce input signals according to a state of the application being run by the entertainment system 10. For example, the input signals may be produced by the virtual input device in a similar manner to the input signals produced by a physical input device in response to user interactions when a user is playing a video game. In embodiments, this is achieved by producing input signals according to a machine learning model that has been trained using sample data of input signals produced by a physical input device in response to user interactions. The input signals are produced based on data relating to a state of the video game and machine learning data that indicate which user-prompted input signals are usually produced in a same state of the video game optionally together with current input data from the or each other controller. The input signals can therefore be produced in a way that is reactive to the video game environment and optionally the inputs of the or each other user. In these embodiments, the machine learning model may be retrieved from any suitable source, such as internal storage, a remote server, or the like. This allows a single user to benefit from only using a subset of controls without requiring another user to be present.

In some embodiments, the entertainment system 10 is configured to select a particular machine learning model to use based on the application being run on the system 10. Here, the entertainment system 10 will identify the application that is being run, then retrieve a particular machine learning model that is associated with the application. For example, if a particular video game is being launched the system 10 may retrieve a machine learning model that is trained on data relating to that particular video game. This allows the system 10 to select a model that will provide input signals that more accurately reflect real gameplay by another user.

Alternatively or in addition, a game may make use of an existing AI system (whether based on machine learning or coded rules, or a combination) that controls one or more in-game non-player characters (NPCs). Such characters typically navigate within the virtual world and perform actions autonomously according to behaviours and rules implemented by the in-game AI system. Hence optionally aspects of the player's character can be controlled as if it was an NPC, either using a suitable existing NPC's rules, or providing some for the user's character specifically for the purpose of the present technique. Again which aspects of control are left to the player's controller and which to the AI system may optionally be selected to suit the user as described elsewhere herein. In this case, the inputs from the in-game AI may be interpreted as controller inputs, or (because the AI is integral with the game) may be interpreted as the effective response to those inputs, further virtualising the co-pilot inputs so that the parts of the input set complementary to those of the user are simply assumed to exist when aggregating from the user and the AI source.

Hence optionally if at least one of the input devices is a virtual input device, then the system may be configured to produce either input signals associated with the virtual input device according to a machine learning model, or control for a target object (such as the user's character) according to an in-game AI on behalf of a (no longer modelled) virtual input device.

It will be appreciated that combining a utilised subset of inputs from two or more real controllers to present to an application as inputs from a single controller advantageously helps someone to co-play and assist a user who has difficulties fully using a controller, so that they can potentially play conventional games without further adaptation. Meanwhile, providing a virtual controller of the kind described herein provides this co-play assistive function when someone else is not available to join the user.

Figure 7:
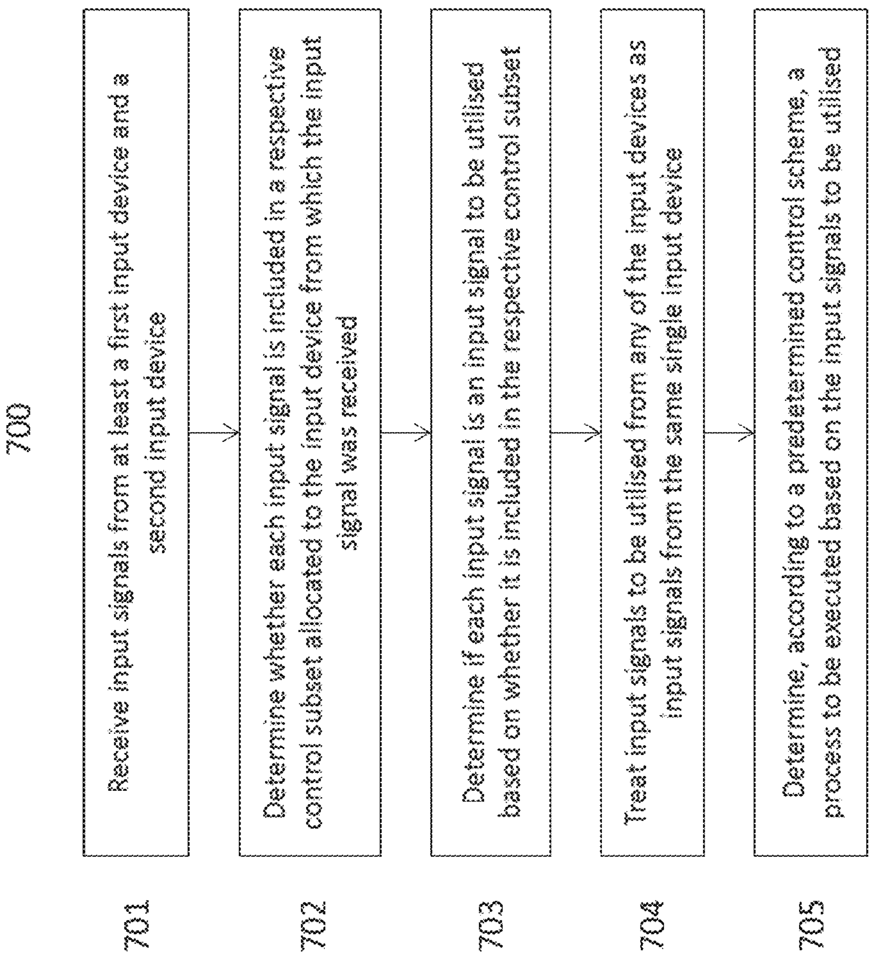
FIG. 7 is a flowchart of a method 700.

FIG. 7 is a flowchart of a method 700 comprising the following steps. In step 701, input signals from at least a first input device and a second input device are received, wherein each input signal corresponds to a control in one of the input devices. In step 702, it is determined whether each input signal is included in a respective control subset allocated to the input device from which the input signal was received. The respective control subsets each comprise at least one control not found in the other control subsets, and the respective control subsets together comprise a full complement of controls for an input device. In step 703, it is determined if each input signal is an input signal to be utilised based on whether it is included in the respective control subset. In step 704, input signals to be utilised from any of the input devices are treated as input signals from the same single input device. In step 705, a process to be executed is determined according to a predetermined control scheme, based on the input signals to be utilised.

It will be apparent to a person skilled in the art that variations in the above method corresponding to operation of the various embodiments of the apparatus as described and claimed herein are considered within the scope of the present invention.

It will be appreciated that the above methods may be carried out on conventional hardware (such as entertainment system 10 suitably adapted as applicable by software instruction or by the inclusion or substitution of dedicated hardware.

Thus the required adaptation to existing parts of a conventional equivalent device may be implemented in the form of a computer program product comprising processor implementable instructions stored on a non-transitory machine-readable medium such as a floppy disk, optical disk, hard disk, solid state disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these or other networks.

In a summary embodiment of the present description, an entertainment system comprises circuitry configured to receive input signals from at least a first input device and a second input device, wherein each input signal corresponds to a control in one of the input devices, determine whether each input signal is included in a respective control subset allocated to the input device from which the input signal was received, determine if each input signal is an input signal to be utilised based on whether it is included in the respective control subset, treat input signals to be utilised from any of the input devices as input signals from the same single input device, and determine, according to a predetermined control scheme, a process to be executed based on the input signals to be utilised and wherein the respective control subsets each comprise at least one control not found in the other control subsets, and the respective control subsets together comprise a full complement of controls for an input device, as described elsewhere herein.

It will be apparent to a person skilled in the art that variations in the above system corresponding to operation of the various embodiments as described and claimed herein are considered within the scope of the present invention, including but not limited to that: the respective control subsets comprise at least one subset that consists of controls located on a first half of an input device and at least one other subset that consists of controls located on a second opposing half of another input device, as described elsewhere herein; the respective control subsets comprise at least one subset that consists of controls that are buttons on a handheld input device and at least one other subset that consists of controls that are joysticks on a handheld input device, as described elsewhere herein; the respective control subsets comprise at least one subset that comprises controls that are motion sensors and at least one other subset that consists of controls that are not motion sensors, as described elsewhere herein; the circuitry is further configured to execute processing to provide a display to a user when an input signal that corresponds to a predetermined control is received from an input device, wherein the display indicates at least one of the respective control subsets, as described elsewhere herein; the circuitry is further configured to execute processing to provide a user interface to a user, wherein the user interface allows the user to select a control subset to be allocated to an input device, as described elsewhere herein; the user interface allows the user to choose a control to be included or not included in the selected control subset, as described elsewhere herein; the circuitry is further configured to determine a number of input signals that are not input signals to be utilised which have been received from an input device within a predetermined time, and execute processing to provide an alert to a user when the determined number of input signals exceeds a predetermined threshold, as described elsewhere herein; at least one of the input devices is a virtual input device, as described elsewhere herein; the circuitry is further configured to produce input signals associated with the virtual input device according to a machine learning model, as described elsewhere herein; at least one of the input devices is a handheld controller, as described elsewhere herein; at least one of the input devices is a mobile phone, as described elsewhere herein; and the entertainment system further comprises the first input device and the second input device, as described elsewhere herein.

Similarly, in a summary embodiment of the present description, a method of utilising input signals from two or more input devices, comprises receiving input signals from at least a first input device and a second input device, wherein each input signal corresponds to a control in one of the input devices, determining whether each input signal is included in a respective control subset allocated to the input device from which the input signal was received, determining if each input signal is an input signal to be utilised based on whether it is included in the respective control subset, treating input signals to be utilised from any of the input devices as input signals from the same single input device, and determining, according to a predetermined control scheme, a process to be executed based on the input signals to be utilised and wherein the respective control subsets each comprise at least one control not found in the other control subsets, and the respective control subsets together comprise a full complement of controls for an input device, as described elsewhere herein.

It will be apparent to a person skilled in the art that variations in the above method corresponding to operation of the various embodiments of the apparatus as described and claimed herein are considered within the scope of the present invention.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A computer-implemented method comprising:

receiving (i) one or more input signals from a physical input device, and (ii) one or more input signals from a virtual input device, each input signal corresponding to a selection of a control on a respective input device, wherein a machine learning model is configured to produce the one or more input signals from the virtual input device;

determining that (i) the selected control on the physical input device that corresponds to the one or more input signals that are received from the physical input device is included in a control subset that is allocated to the physical input device, and (ii) the selected control on the virtual input device that corresponds to the one or more input signals that are received from the virtual input device is included in a control subset that is allocated to the virtual input device; and in response to determining that (i) the selected control on the physical input device that corresponds to the one or more input signals that are received from the physical input device is included in the control subset that is allocated to the physical input device, and (ii) the selected control on the virtual input device that corresponds to the one or more input signals that are received from the virtual input device is included in the control subset that is allocated to the virtual input device, providing the one or more input signals that are received from the physical input device and the one or more input signals that are received from the virtual input device as input signals from a same single input device.

2. The method of claim 1, wherein the control subset that is allocated to the physical input device and the control subset that is allocated to the virtual input device together comprise all controls associated with a single input device.

3. The method of claim 1, comprising:

accessing a predetermined control subset sharing scheme that designates which controls from among all controls that are associated with a single input device are allocated to the physical input device and which controls from among all controls that are associated with the single input device are allocated to the virtual input device.

4. The method of claim 1, comprising:

accessing a user specified control subset sharing scheme that designates which controls from among all controls that are associated with a single input device a user has dynamically allocated to the physical input device and which controls from among all controls that are associated with the single input device the user has dynamically allocated to the virtual input device.

5. The method of claim 1, comprising providing, for output, a visual representation of the single input device depicting the selected control from the physical input device and the selected control from the virtual input device as selected.

6. The method of claim 1, wherein providing the one or more input signals as input signals from the same single input device comprises providing features of the one or more input signals to the machine learning model.

7. The method of claim 1, wherein the control subsets are allocated by a user while a game is paused, via a sharing scheme selection interface.

8. The method of claim 6, comprising training the machine learning model using sample data of input signals produced by the physical input device in response to user interactions.

9. A system comprising:

one or more processors, and one or more non-transitory computer-readable media that store instructions which, when executed, cause the one or more processors to perform operations comprising:

receiving (i) one or more input signals from a physical input device, and (ii) one or more input signals from a virtual input device, each input signal corresponding to a selection of a control on a respective input device, wherein a machine learning model is configured to produce the one or more input signals from the virtual input device;

determining that (i) the selected control on the physical input device that corresponds to the one or more input signals that are received from the physical input device is included in a control subset that is allocated to the physical input device, and (ii) the selected control on the virtual input device that corresponds to the one or more input signals that are received from the virtual input device is included in a control subset that is allocated to the virtual input device; and in response to determining that (i) the selected control on the physical input device that corresponds to the one or more input signals that are received from the physical input device is included in the control subset that is allocated to the physical input device, and (ii) the selected control on the virtual input device that corresponds to the one or more input signals that are received from the virtual input device is included in the control subset that is allocated to the virtual input device, providing the one or more input signals that are received from the physical input device and the one or more input signals that are received from the virtual input device as input signals from a same single input device.

10. The system of claim 9, wherein the control subset that is allocated to the physical input device and the control subset that is allocated to the virtual input device together comprise all controls associated with a single input device.

11. The system of claim 9, wherein the operations comprise:

accessing a predetermined control subset sharing scheme that designates which controls from among all controls that are associated with a single input device are allocated to the physical input device and which controls from among all controls that are associated with the single input device are allocated to the virtual input device.

12. The system of claim 9, wherein the operations comprise:

accessing a user specified control subset sharing scheme that designates which controls from among all controls that are associated with a single input device a user has dynamically allocated to the physical input device and which controls from among all controls that are associated with the single input device the user has dynamically allocated to the virtual input device.

13. The system of claim 9, wherein the operations comprise providing, for output, a visual representation of the single input device depicting the selected control from the physical input device and the selected control from the virtual input device as selected.

14. The system of claim 9, wherein providing the one or more input signals as input signals from the same single input device comprises providing features of the one or more input signals to the machine learning model.

15. The system of claim 9, wherein the control subsets are allocated by a user while a game is paused, via a sharing scheme selection interface.

16. One or more non-transitory computer-readable media that store instructions which, when executed, cause one or more processors to perform operations comprising:

receiving (i) one or more input signals from a physical input device, and (ii) one or more input signals from a virtual input device, each input signal corresponding to a selection of a control on a respective input device, wherein a machine learning model is configured to produce the one or more input signals from the virtual input device;

determining that (i) the selected control on the physical input device that corresponds to the one or more input signals that are received from the physical input device is included in a control subset that is allocated to the physical input device, and (ii) the selected control on the virtual input device that corresponds to the one or more input signals that are received from the virtual input device is included in a control subset that is allocated to the virtual input device; and in response to determining that (i) the selected control on the physical input device that corresponds to the one or more input signals that are received from the physical input device is included in the control subset that is allocated to the physical input device, and (ii) the selected control on the virtual input device that corresponds to the one or more input signals that are received from the virtual input device is included in the control subset that is allocated to the virtual input device, providing the one or more input signals that are received from the physical input device and the one or more input signals that are received from the virtual input device as input signals from a same single input device.

17. The media of claim 16, wherein the control subset that is allocated to the physical input device and the control subset that is allocated to the virtual input device together comprise all controls associated with a single input device.

18. The media of claim 16, wherein the operations comprise:

accessing a predetermined control subset sharing scheme that designates which controls from among all controls that are associated with a single input device are allocated to the physical input device and which controls from among all controls that are associated with the single input device are allocated to the virtual input device.

19. The media of claim 16, wherein the operations comprise:

accessing a user specified control subset sharing scheme that designates which controls from among all controls that are associated with a single input device a user has dynamically allocated to the physical input device and which controls from among all controls that are associated with the single input device the user has dynamically allocated to the virtual input device.

20. The method of claim 8, wherein the input signals are produced by the machine learning model based on data relating to a state of a video game and machine learning data, wherein the machine learning data identifies an association between a plurality of user-prompted input signals and the state of the video game.

* * * * *